Sept. 7, 1926.

A. W. WAY

HINGE

Filed Feb. 14, 1923  3 Sheets-Sheet 1

1,599,258

Inventor—
Alban Warren Way.
by his Attorneys.
Howson & Howson

Sept. 7, 1926. 1,599,258
A. W. WAY
HINGE
Filed Feb. 14, 1923   3 Sheets-Sheet 2
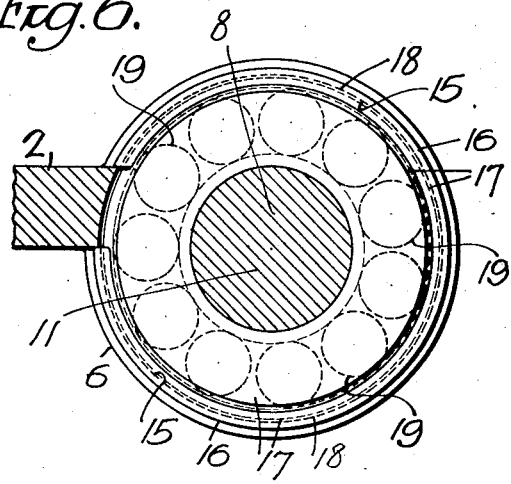
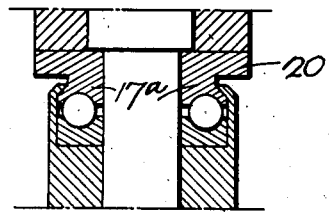
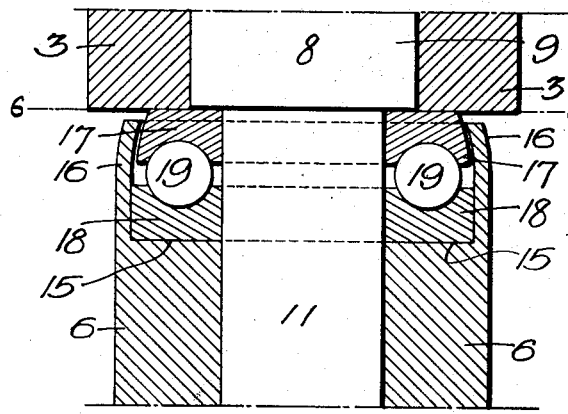
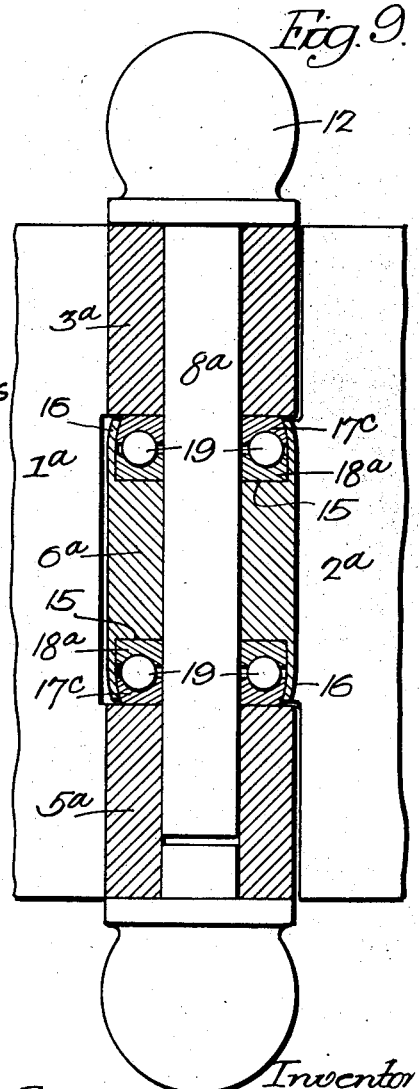
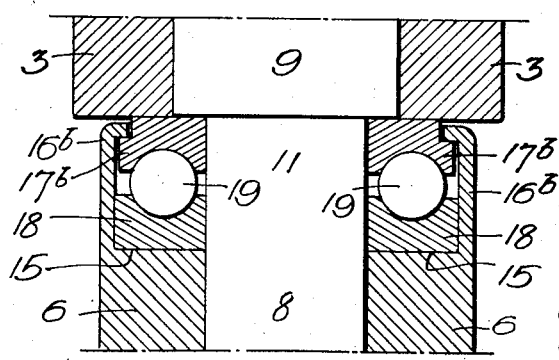
Inventor
Alban Warren Way.
by his Attorneys
Howson & Howson Sept. 7, 1926.

A. W. WAY 1,599,258

HINGE

Filed Feb. 14, 1923   3 Sheets-Sheet 3

Inventor.—
Alban Warren Way.
by his Attorneys.—

Patented Sept. 7, 1926.

1,599,258

UNITED STATES PATENT OFFICE.

ALBAN WARREN WAY, OF PHILADELPHIA, PENNSYLVANIA.

HINGE.

Application filed February 14, 1923. Serial No. 618,972.

One object of my invention is to provide a hinge with anti-friction bearings, which are enclosed in certain knuckles of the hinge.

A further object of the invention is to so construct an anti-friction bearing hinge that when the pintle is withdrawn the anti-friction bearing will not become detached from the leaf of the hinge in which it is mounted, and a still further object of the invention is to so design the knuckle that the wall of the recess in which the bearing is mounted acts as a retaining means for the members of the anti-friction bearing.

The invention is especially adapted to hinges having eccentric pintles so that the leaves of the hinges can be adjusted to fit a door to a frame, although it will be understood that the invention can be applied to the ordinary hinge.

In the accompanying drawing:—

Fig. 5 is an enlarged sectional elevation of the ball bearing shown in Fig. 1;

Fig. 6 is a sectional plan view on the line 6—6, Fig. 5;

Fig. 7 is a view showing the outer race having an extended flange;

Fig. 9 is a sectional view of an ordinary hinge showing my improved ball bearing applied thereto;

Figs. 10 to 14, inclusive, illustrate modifications of the invention, and

Figure 15:
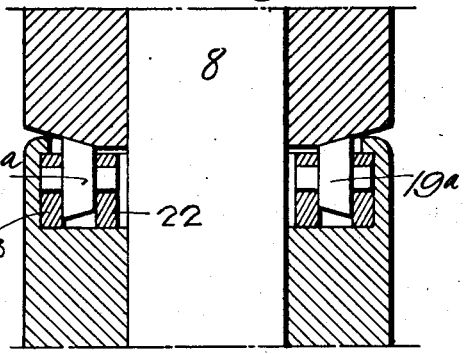

Fig. 15 is a view illustrating the anti-friction device in the form of a roller bearing.

Referring to Figs. 1 to 6 of the drawings, 1 and 2 are the two leaves of a hinge. The leaf 1 has three knuckles 3, 4 and 5. The leaf 2 has two knuckles 6 and 7 located in the spaces between the knuckles of the leaf 1.

8 designates a pintle having concentric portions 9 and 10, one at each end, and an intermediate eccentric portion 11, which extends through the two knuckles 6 and 7 of the leaf 2 and through the knuckle 4 of the leaf 1. The opening in the knuckle 4 is of such diameter as to give clearance to the eccentric. On one end of the pintle is a head 12 by which the pintle can be turned when it is raised to allow the lug 13 on the under side of the head to clear the notches in the knuckle 3. The lower end of the pintle is located in a bearing 14 driven into the lower knuckle, or formed integral therewith.

The particular construction of the hinge hereinbefore described is fully set forth and claimed in a patent granted to J. H. Way, on the 12th day of December, 1916, No. 1,208,422.

Each of the knuckles 6 and 7 of the leaf 2 is recessed at one end, as at 15. The wall 16 of the recess is comparatively thin. Located in each of the recesses 15 are two ball races 17 and 18 and a series of balls 19. The outer race extends beyond the end of the knuckle, as clearly shown in Fig. 5, and the knuckle 3 of the leaf 1 rests directly upon it. The periphery of the race 17 is curved, as shown, and the wall 16 of the recess is pressed over this portion of the race, holding the parts of the ball bearing in position in the recess.

This is a simple construction. The ball bearings are protected from dust and are not exposed to view. As they are confined to the knuckles, the pintle can be withdrawn from the knuckles to allow the leaves to be secured independently to the door and frame.

The ball bearing in the knuckle 7 is similar to that in the knuckle 6 and is secured to the knuckle in the same manner. By providing two ball bearings, as shown, the hinge can be reversed when applied to a door and frame.

In Fig. 7 a modification is shown, in which the outer race 17$^a$ has an extended flange 20 to carry the load. In this instance, the periphery of the race is beveled and the wall of the recess, in which the bearing is located, is bent over the beveled portion.

Figure 1:
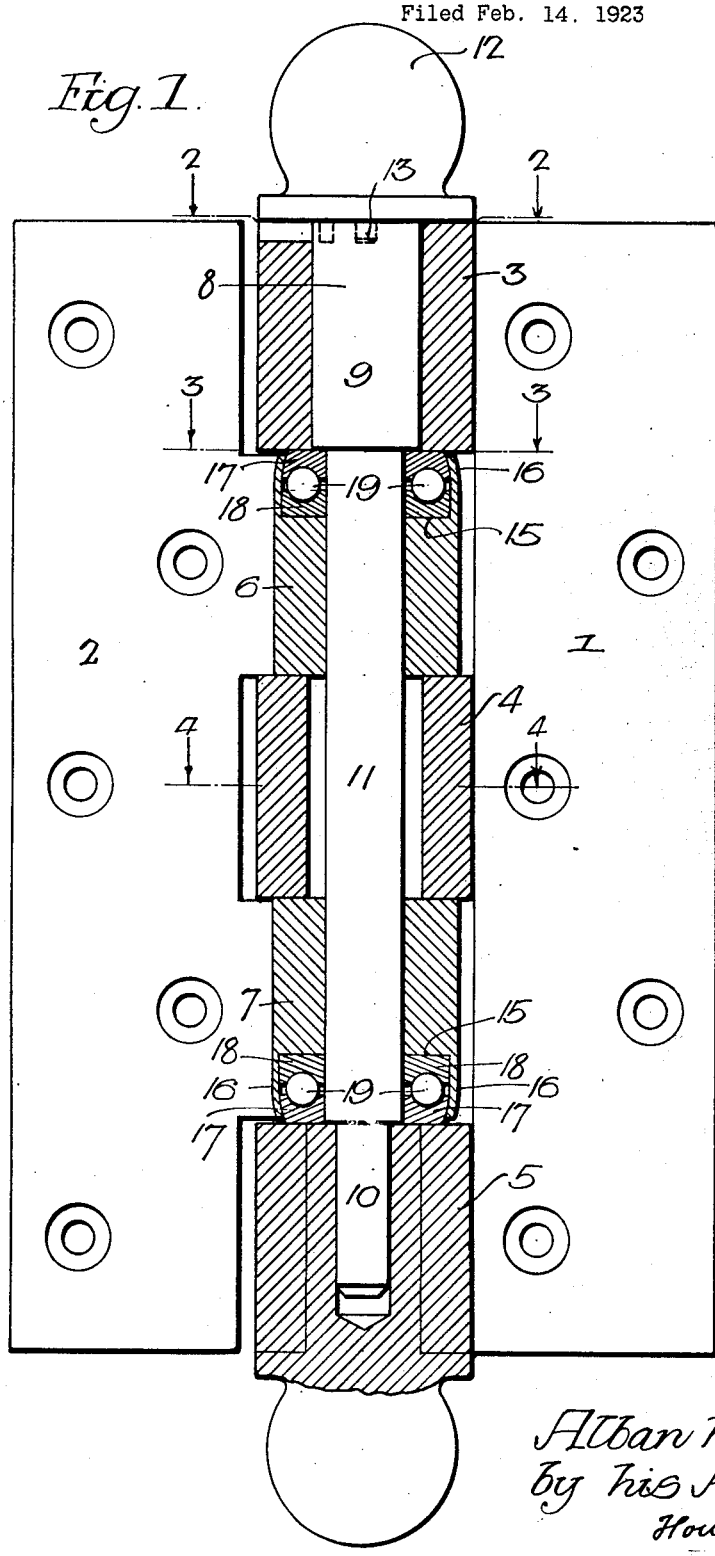
Figure 1 is a side view of an open hinge showing the knuckles in section and illustrating my invention.
Figure 2:
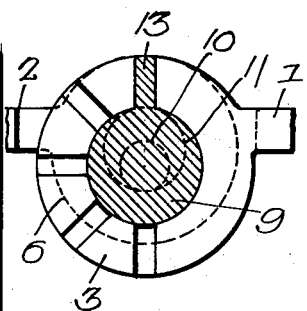
Fig. 2 is a sectional view on the line 2—2, Fig. 1.
Figure 3:
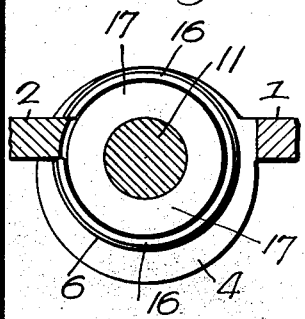
Fig. 3 is a sectional view on the line 3—3, Fig. 1.
Figure 4:
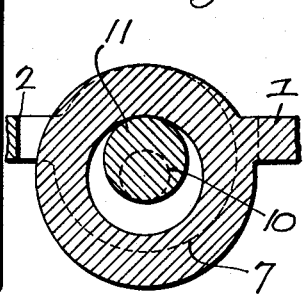
Fig. 4 is a sectional view on the line 4—4, Fig. 1.
Figure 8:
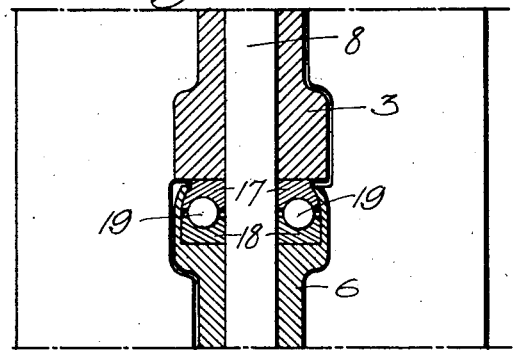
Fig. 8 is a view showing a large ball bearing located in an enlarged portion of the knuckle.

In Fig. 8 the ball bearing is located in an enlarged portion of the knuckle. In this construction, enlarged race sections may be used in connection with large balls.

In Fig. 9, the invention is shown as applied to a three-knuckle hinge of the ordinary type. The leaf 1$^a$ has two knuckles 3$^a$ and 5$^a$. The leaf 2$^a$ has an intermediate knuckle 6$^a$. Each end of this knuckle 6$^a$ is recessed to receive a ball bearing, and the races 17ᶜ and 18ᵃ of the bearings are held in place in the same manner as those in Fig. 1. The pintle 8ᵃ, in this instance, is of an even diameter throughout.

In Fig. 10, the periphery of the outer race 17ᵇ is stepped to form a shoulder to receive the turned in portion of the wall 16ᵇ of the knuckle.

Figure 11:
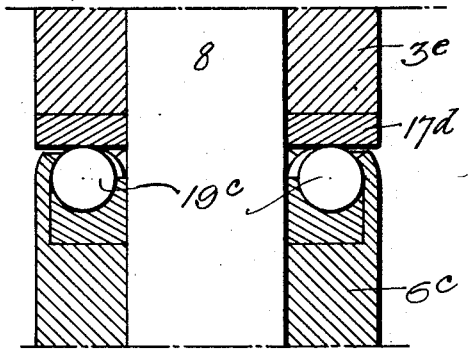

Fig. 11 illustrates a construction in which a hard metal plate 17ᵈ on the knuckle 3ᶜ rests upon the balls 19ᶜ carried by the knuckle 6ᶜ.

Figure 12:
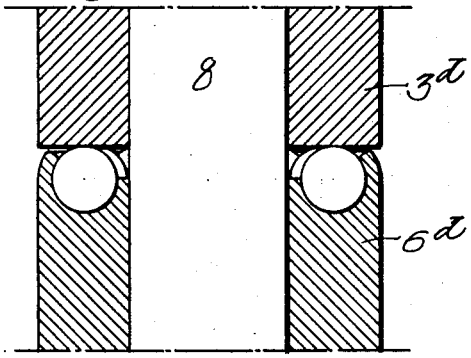
Figure 14:
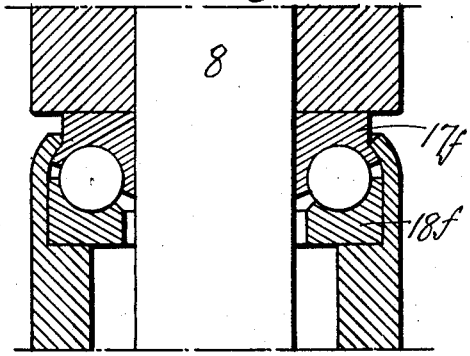

In Fig. 12, the separate lower raceway is dispensed with, the knuckle 6ᵈ forming the raceway, and the knuckle 3ᵈ rests directly upon the balls. This construction can be used when the leaves of the hinge are made of special metals.

Figure 13:
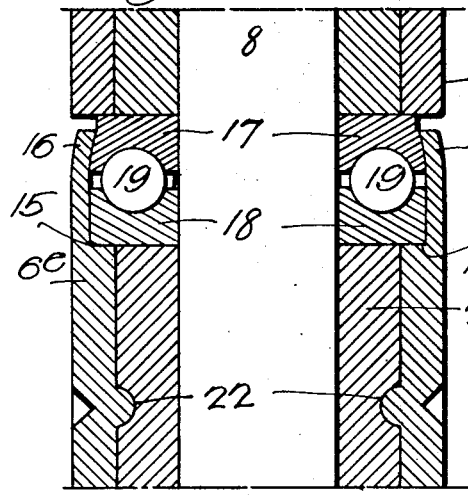

Fig. 13 illustrates a construction which may be used when the knuckles are rolled from flat stock. 6ᵉ is the knuckle containing the ball bearing, and located in the knuckle is a sleeve 21 secured to the knuckle in any suitable manner. A groove 22 is formed in the periphery of the sleeve in the present instance, into which is forced a projection from the metal of the knuckle. In some instances, it is desirable to provide for lateral thrust as well as vertical thrust, and this is accomplished by making the ball bearing in the manner shown in Fig. 14. The race 17ᶠ fits the pintle, and the race 18ᶠ is clear of the pintle so that any lateral pressure is taken by the balls located between the races.

In Fig. 15, I have shown the anti-friction bearing provided with rollers 19ᵃ in place of the balls. The rollers in the present instance have trunnions which are located in the inner and outer rings 22 and 23. The walls of the recess in which the bearing is located is flanged over the outer ring to retain the bearing in place when the leaves of the hinge are separated.

I claim:—

1. The combination in a hinge, of two leaves, each having knuckles, the knuckles of one leaf alternating with those of the other leaf; a knuckle of one leaf being recessed at one end leaving a thin wall; and a ball bearing located in the recess, said ball bearing consisting of an outer and an inner raceway and a series of balls, the periphery of the outer raceway being beveled and the wall of the recess conforming to the beveled portion of the raceway, holding it in position.

2. The combination in a hinge, of two leaves, each having knuckles; a pintle extending through the knuckles, one of said knuckles being recessed at one end; a ball bearing located in the recess and consisting of an inner raceway, an outer raceway and a series of balls; and means for engaging the outer raceway to hold the ball bearing in the recess, the outer raceway extending beyond the end of the knuckle in which it is mounted and bearing against an adjoining knuckle.

3. The combination in a hinge, of two leaves, one of said leaves having three knuckles, and the other leaf having two knuckles, each of the knuckles of the two knuckle leaf having a recess in one end; an anti-friction bearing in each recess extending beyond the end of the knuckle and resting against an adjoining knuckle; means for retaining the bearings in their recesses; and a pintle connecting the knuckles, said pintle having an eccentric portion engaging the knuckles of the two knuckle leaf, so that when the pintle is turned the leaves of the hinge can be adjusted one in respect to the other.

ALBAN WARREN WAY.